US011296753B2

(12) United States Patent
Chen (10) Patent No.: US 11,296,753 B2
(45) Date of Patent: Apr. 5, 2022

(54) METHOD FOR TRANSMITTING INFORMATION, DEVICE AND COMPUTER STORAGE MEDIUM

(71) Applicant: GUANGDONG OPPO MOBILE TELECOMMUNICATIONS CORP., LTD., Guangdong (CN)

(72) Inventor: Wenhong Chen, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 494 days.

(21) Appl. No.: 16/338,656

(22) PCT Filed: Feb. 26, 2018

(86) PCT No.: PCT/CN2018/077255
§ 371 (c)(1),
(2) Date: Apr. 1, 2019

(87) PCT Pub. No.: WO2019/161565
PCT Pub. Date: Aug. 29, 2019

(65) Prior Publication Data
US 2021/0359726 A1    Nov. 18, 2021

(51) Int. Cl.
*H04B 7/04*       (2017.01)
*H04B 7/0417*     (2017.01)
(Continued)

(52) U.S. Cl.
CPC ......... *H04B 7/0417* (2013.01); *H04B 7/0626* (2013.01); *H04W 24/10* (2013.01); *H04W 80/02* (2013.01)

(58) Field of Classification Search
CPC .... H04B 7/0417; H04B 7/0626; H04B 1/715; H04W 80/02; H04W 24/10; H04W 72/085; H04W 16/14
See application file for complete search history.

(56) References Cited

U.S. PATENT DOCUMENTS 9,877,203 B2    1/2018  Yoo et al.
2014/0003395 A1  1/2014  Hsu et al.
(Continued)

FOREIGN PATENT DOCUMENTS

CN    102811456 A    12/2012
CN    102932111 A     2/2013
(Continued)

OTHER PUBLICATIONS

Pantech: "On CSI ambiguity handling with activation/deactivation", 3GPP Draft; R1-110750, 3rd Generation Partnership Project (3GPP), Mobile Competence Centre ; 650, Route Des Lucioles ; F-06921 Sophia-Antipolis Cedex ; France, vol. RAN WG1, No. Taipei, Taiwan; Feb. 21, 2011, Feb. 17, 2011 (Feb. 17, 2011), XP050490754, [retrieved on Feb. 17, 2011] * paragraph [0002] *.
Qualcomm Incorporated: "On Type I and Type II CSI Feedback Using PUCCH", 3GPP Draft; R1-1711165, 3rd Generation Partnership Project (3GPP), Mobile Competence Centre ; 650, Route Des Lucioles ; F-06921 Sophia-Antipolis Cedex ; France, vol. RAN WG1, No. Qingdao, China; Jun. 27, 2017-Jun. 30, 2017 Jun. 26, 2017 (Jun. 26, 2017), XP051300365, Retrieved from the Internet: URL:http://www.3gpp.org/ftp/Meetings_3GPP_SYNC/RAN1/Docs/ [retrieved on Jun. 26, 2017] * paragraph [0002] *.
(Continued)

*Primary Examiner* — Fred A Casca
(74) *Attorney, Agent, or Firm* — Ladas & Parry LLP (57) ABSTRACT

Provided in the embodiments of the disclosure are a method for transmitting information, a device and a computer storage medium. The method may be applied to a network side device and include: sending first information to a terminal device, the first information including a resource indicator for performing a quasi-periodic Channel State Information (CSI) feedback and duration candidate values of the quasi-periodic CSI feedback; and sending second information to the terminal device, the second information including an activation indicator for activating the quasi-periodic CSI feedback and determination information for determining a duration of the quasi-periodic CSI feedback from the candidate values.

20 Claims, 5 Drawing Sheets

(51) Int. Cl.
*H04B 7/06* (2006.01)
*H04W 24/10* (2009.01)
*H04W 80/02* (2009.01)

(56) References Cited

U.S. PATENT DOCUMENTS

| | | |
|---|---|---|
| 2014/0112186 A1 | 4/2014 | Fan |
| 2015/0249511 A1 | 9/2015 | Chen |
| 2016/0330630 A1* | 11/2016 | Yoo ................. H04L 5/0048 |
| 2016/0352482 A1 | 12/2016 | Sun et al. |
| 2018/0146381 A1 | 5/2018 | Yoo et al. |
| 2019/0215781 A1* | 7/2019 | Jeon ................. H04W 24/10 |

FOREIGN PATENT DOCUMENTS

| | | | |
|---|---|---|---|
| CN | 103856300 A | 6/2014 |
| CN | 104303430 A | 1/2015 |
| CN | 106899522 A | 6/2017 |
| CN | 107534869 A | 1/2018 |
| CN | 107683579 A | 2/2018 |
| EP | 2731290 A1 | 5/2014 |
| WO | 2014019169 A1 | 2/2014 |
| WO | 2014036909 A1 | 3/2014 |
| WO | 2016179016 A2 | 11/2016 |

OTHER PUBLICATIONS

Supplementary European Search Report in the European application No. 18852767.5, dated Sep. 9, 2019.
First Office Action of Chinese application No. 201880003435.8, dated Dec. 2, 2019.
International Search Report in the international application No. PCT/CN2018/077255, dated Nov. 1, 2018.
Written Opinion of the International Search Authority in the international application No. PCT/CN2018/077255, dated Nov. 1, 2018.
International Search Report in international application No. PCT/CN2018/077255, dated Nov. 1, 2018.
Written Opinion of the International Search Authority in international application No. PCT/CN2018/077255, dated Nov. 1, 2018.
Intel Corporation UL URLLC transmission schemes 3GPP TSG RAN WG1 Meeting #87 R1-1612004 (Nov. 18, 2016).
Intel Corporation On UL grant free transmissions 3GPP TSG RAN WG1 Meeting #89 R1-1707407(May 19, 2017).

* cited by examiner

FIG. 1

| First information is sent to a terminal device, wherein the first information includes a resource indicator for performing a quasi-periodic CSI feedback and duration candidate values of the quasi-periodic CSI feedback | ⟵ S201 |

| Second information is sent to the terminal device, wherein the second information includes an activation indicator for activating the quasi-periodic CSI feedback and determination information for determining a duration of the quasi-periodic CSI feedback from the candidate values | ⟵ S202 |

METHOD FOR TRANSMITTING INFORMATION, DEVICE AND COMPUTER STORAGE MEDIUM

RELATED APPLICATION

This application is an application under 35 U.S.C. 371 of International Application No. PCT/CN2018/077255 filed on Feb. 26, 2018, the entire contents of which are incorporated herein by reference.

TECHNICAL FIELD

The disclosure relate to the technical field of wireless communication, and in particular to a method for transmitting information, a device and a computer storage medium.

BACKGROUND

Along with the development of a communication technology, the research on a 5th Generation (5G) has already been conducted. Radio access in the 5G is called as a New Radio (abbreviated as NR). In the present NR related art, a quasi-periodic resource transmission mechanism and a quasi-periodic Channel State Information (CSI) feedback mechanism are introduced, so that a terminal device can feed back CSI for a persistent duration during data burst or beam measurement.

For the above quasi-periodic CSI feedback mechanism, generally, a terminal is activated by a base station to execute the quasi-periodic CSI feedback mechanism. However, at present, there is no deactivating solution for the quasi-periodic CSI feedback mechanism.

SUMMARY

The disclosure are intended to provide a method for transmitting information, a device and a computer storage medium, which can deactivate a quasi-periodic CSI reporting mechanism.

The technical solutions in the embodiments of the disclosure may be implemented as follows.

According to a first aspect, the disclosure provides a method for transmitting information. The method is applied to a network side device and may include the following operations.

First information is sent to a terminal device, wherein the first information includes a resource indicator for performing a quasi-periodic CSI feedback and duration candidate values of the quasi-periodic CSI feedback.

Second information is sent to the terminal device, wherein the second information includes an activation indicator for activating the quasi-periodic CSI feedback and determination information for determining a duration of the quasi-periodic CSI feedback from the candidate values.

According to a second aspect, the disclosure provides a method for transmitting information. The method is applied to a terminal device and may include the following operations.

First information sent by a network side device is received, wherein the first information includes a resource indicator for performing a quasi-periodic CSI feedback and duration candidate values of the quasi-periodic CSI feedback.

Second information sent by the network side device is received, wherein the second information includes an activation indicator for activating the quasi-periodic CSI feedback and determination information for determining a duration of the quasi-periodic CSI feedback from the candidate values.

Based on the first information and the second information, the duration of the quasi-periodic CSI feedback is determined.

Quasi-periodic CSI is fed back to the network side device within the duration.

When the duration expires, the quasi-periodic CSI is stopped being fed back to the network side device.

According to a third aspect, the disclosure provides a network side device, which may include a first sending component and a second sending component. The first sending component is configured to send first information to a terminal device, wherein the first information includes resource indicator for performing a quasi-periodic CSI feedback and duration candidate values of the quasi-periodic CSI feedback.

The second sending component is configured to send second information to the terminal device, wherein the second information includes an activation indicator for activating the quasi-periodic CSI feedback and determination information for determining a duration of the quasi-periodic CSI feedback from the candidate values.

According to a fourth aspect, the disclosure provides a terminal device, which may include a first receiving component, a second receiving component, a determination component and a feedback component.

The first receiving component is configured to receive first information sent by a network side device, wherein the first information includes a resource indicator for performing a quasi-periodic CSI feedback and duration candidate values of the quasi-periodic CSI feedback.

The second receiving component is configured to receive second information sent by the network side device, wherein the second information includes an activation indicator for activating the quasi-periodic CSI feedback and determination information for determining a duration of the quasi-periodic CSI feedback from the candidate values.

The determination component is configured to determine, based on the first information and the second information, the duration of the quasi-periodic CSI feedback.

The feedback component is configured to feed the quasi-periodic CSI back to the network side device within the duration, and stop feeding the quasi-periodic CSI back to the network side device.

According to a fifth aspect, the disclosure provides a network side device, which may include a first network interface, a first memory and a first processor. The first network interface is configured to receive and send a signal in a process of receiving and sending information with other external network elements.

The first memory is configured to store a computer program capable of being operated on the first processor.

The first processor is configured to execute operations of the method in the first aspect when operating the computer program.

According to a sixth aspect, the disclosure provides a terminal device, which may include a second network interface, a second memory and a second processor. The second network interface is configured to receive and send a signal in a process of receiving and sending information with other external network elements.

The second memory is configured to store a computer program capable of being operated on the second processor.

The second processor is configured to execute operations of the method in the second aspect when operating the computer program.

According to a seventh aspect, the disclosure provides a computer storage medium. The computer storage medium stores an information transmission program, and the information transmission program, when executed by at least one processor, implements the operations of the method in the first aspect or the operations of the method in the second aspect.

The disclosure provides a method for transmitting the information, a device and a computer storage medium. In the embodiments of the disclosure, the network side device can provide the duration candidate values of the quasi-periodic CSI feedback and the determination information for determining the duration of the quasi-periodic CSI feedback from the candidate values, while indicating a resource used by the quasi-periodic CSI feedback and activating the quasi-periodic CSI feedback. Therefore, the terminal acquires the duration of the quasi-periodic CSI feedback based on the duration candidate values and the determination information and then deactivates the quasi-periodic CSI feedback, thereby implementing the deactivation on the quasi-periodic CSI reporting mechanism, preventing a situation that the terminal cannot stop feeding back the quasi-periodic CSI in an appropriate time, and saving channel resources.

DETAILED DESCRIPTION

In order to understand the characteristics and technical contents of the embodiments of the disclosure in more detail, the implementation of the embodiments of the disclosure will be described in detail in combination with accompanying drawings. The appended accompanying drawings are merely for reference, and are not intended to limit the embodiments of the disclosure.

Figure 1:
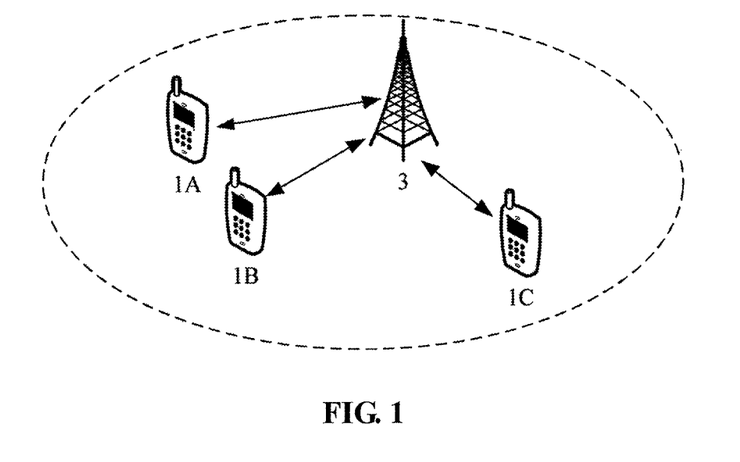
FIG. 1 illustrates a structural schematic diagram of a wireless communication system provided by an embodiment of the disclosure.

Generally, FIG. 1 illustrates a structure of a wireless communication system 10 in a non-typical example. In FIG. 1, the wireless communication system may include terminal devices 1A to 1C and a base station device 3. It is to be noted that the terminal devices 1A to 1C may also be referred to User Equipment (abbreviated as "UE"), an access terminal, a user unit, a user station, a mobile station, a mobile radio station, a remote station, a remote terminal, a mobile device, a user terminal, a terminal, a wireless communication device and a user agent or a user device. The terminal device may be a Station (abbreviated as "ST") in a Wireless Local Area Networks (abbreviated as "WLAN"), and may be a cellular phone, a cordless telephone, a Session Initiation Protocol (abbreviated as "SIP") phone, a Wireless Local Loop (abbreviated as "WLL") station, a Personal Digital Assistant (abbreviated as "PDA"), a handheld device having a wireless communication function, a computing device or other processing devices connected to a wireless modem, a vehicle-mounted device, a wearable device, and a next generation communication system, such as a terminal device in a Fifth-Generation (abbreviated as "5G") communication network or a terminal device in a future evolved Public Land Mobile Network (abbreviated as "PLMN") network. In the embodiments of the disclosure, the terminal device may further be a wearable device. The wearable device may also be referred to as a wearable intelligent device, which is a general name of a wearable device obtained by intelligently designing and developing a daily wear with a wearable technology, such as eyeglasses, gloves, a watch, a costume and shoes, etc.

The base station device 3 may be an Evolutional Node B (abbreviated as "eNB" or "eNodeB") in a Long Term Evolution (LTE), or a relay station or an access point, or a vehicle-mounted device, a wearable device and a network device in an NR network, such as a 5G Node B (gNB) or a network device in a future evolved PLMN network.

Based on the wireless communication system illustrated in FIG. 1, in at least one example for the terminal 1A and the base station gNB, when the terminal has a data burst or performs beam measurement, it is necessary to feed back CSI within a persistent period, and thus the quasi-periodic CSI reporting mechanism is implemented. Specifically, the implementation process for activating the quasi-periodic CSI reporting mechanism is as follows.

The gNB may activate, via Downlink Control Information (DCI), the terminal 1A to feed back the quasi-periodic CSI on semi-persistent Physical Uplink Shared CHannel (PUSCH) resources.

Alternatively, the gNB may activate, via a Medium Access Control Layer Control Element (MAC CE), the terminal 1A to feed back the quasi-periodic CSI on semi-persistent Physical Uplink Control CHannel (PUCCH) resources.

The above activation process is merely for activating the terminal to feed back the quasi-periodic CSI, and does not indicate when to stop. Therefore, the terminal cannot stop feeding back the quasi-periodic CSI in an appropriate time, thereby resulting in waste of the channel resources.

Based on the above problems, the disclosure provides the following embodiments.

Embodiment 1

Figure 2:
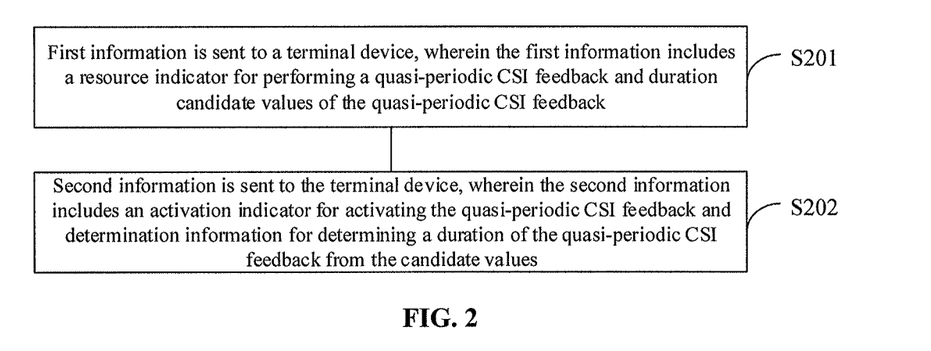
FIG. 2 illustrates a schematic flowchart of a method for transmitting information provided by an embodiment of the disclosure.

FIG. 2 illustrates a flowchart of a method for transmitting information provided by an embodiment of the disclosure. The method may be applied to a network side device, which specifically may be a base station device such as the gNB. The method may include the following operations.

At S201, first information is sent to a terminal device, wherein the first information includes a resource indicator for performing a quasi-periodic CSI feedback and duration candidate values of the quasi-periodic CSI feedback.

At S202, second information is sent to the terminal device, wherein the second information includes an activation indicator for activating the quasi-periodic CSI feedback and determination information for determining a duration of the quasi-periodic CSI feedback from the candidate values.

With the technical solutions illustrated in FIG. 2, the network side device can provide the duration candidate values of the quasi-periodic CSI feedback and the determination information for determining the duration of the quasi-periodic CSI feedback from the candidate values while indicating a resource used by the quasi-periodic CSI feedback and activating the quasi-periodic CSI feedback. Therefore, the terminal acquires the duration of the quasi-periodic CSI feedback based on the duration candidate values and the determination information and then deactivates the quasi-periodic CSI feedback, thereby implementing the deactivation on the quasi-periodic CSI reporting mechanism, preventing a situation that the terminal cannot stop feeding back the quasi-periodic CSI in an appropriate time, and saving channel resources.

For the technical solutions illustrated in FIG. 2, in a possible implementation manner, the operation that the first information is sent to a terminal device may specifically include the following action.

Radio Resource Control (RRC) signaling carrying the first information or an MAC-CE signaling carrying the first information is sent to the terminal device.

For the first information, the resource indicator for performing the quasi-periodic CSI feedback may include at least one of: indication information for indicating a PUCCH resource used to perform the quasi-periodic CSI feedback or indication information for indicating a PUSCH resource used to perform the quasi-periodic CSI feedback. Specifically, the PUCCH resource or the PUSCH resource used to perform the quasi-periodic CSI feedback may be a universal PUCCH resource or PUSCH resource in a protocol, and may also be a semi-persistent PUCCH resource or a semi-persistent PUSCH resource, which will not be elaborated in this embodiment.

The duration of the quasi-periodic CSI feedback may be represented by the number of times of the quasi-periodic CSI feedback or a time length for performing the quasi-periodic CSI feedback. Therefore, the duration candidate values of the quasi-periodic CSI feedback in the first information include: candidate values for the number of times of the quasi-periodic CSI feedback or candidate values for the time length of the quasi-periodic CSI feedback.

For the technical solutions illustrated in FIG. 2, in a possible implementation manner, the operation that the second information is sent to the terminal device may specifically include the following action.

MAC CE signaling carrying the second information or DCI signaling carrying the second information is sent to the terminal device.

With the method for transmitting the information in this embodiment, after the terminal receives the first information and the second information, the duration of the quasi-periodic CSI feedback can be determined, the terminal performs the quasi-periodic CSI feedback within the duration, and when the duration expires, the terminal stops feeding back the quasi-periodic CSI to the network side device. In this case, it may be considered that the terminal deactivates the quasi-periodic CSI feedback. Correspondingly, the network side device may also stop receiving a quasi-periodic CSI feedback activated by the terminal after the duration expires.

Embodiment 2

Figure 3:
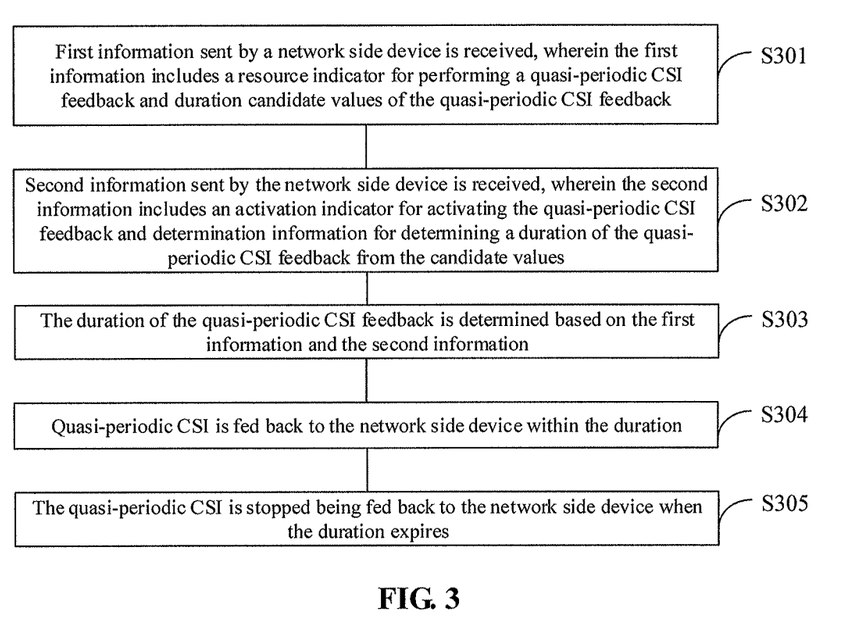
FIG. 3 illustrates a schematic flowchart of another method for transmitting information provided by an embodiment of the disclosure.

Based on an inventive concept same as the foregoing embodiment, FIG. 3 illustrates a flowchart of a method for transmitting information provided by an embodiment of the disclosure. The method may be applied to a terminal device, and may include the following operations.

At S301, first information sent by a network side device is received, wherein the first information includes a resource indicator for performing a quasi-periodic CSI feedback and duration candidate values of the quasi-periodic CSI feedback.

At S302, second information sent by the network side device is received, wherein the second information includes an activation indicator for activating the quasi-periodic CSI feedback and determination information for determining a duration of the quasi-periodic CSI feedback from the candidate values.

At S303, the duration of the quasi-periodic CSI feedback is determined based on the first information and the second information.

At S304, quasi-periodic CSI is fed back to the network side device within the duration.

At S305, when the duration expires, the quasi-periodic CSI is stopped being fed back to the network side device.

With the technical solutions illustrated in FIG. 3, after the terminal receives the first information and the second information sent by the network side device, the terminal determines the duration of the quasi-periodic CSI feedback, and when the duration expires, the terminal stops feeding the quasi-periodic CSI back to the network side device. Therefore, the deactivation on the quasi-periodic CSI feedback is implemented.

For the technical solutions illustrated in FIG. 3, in a possible implementation manner, the operation that the first information sent by a network side device is received may include the following action.

RRC signaling carrying the first information or MAC CE signaling carrying the first information is received.

For the first information, the resource indicator for performing the quasi-periodic CSI feedback may include at least one of: indication information for indicating a PUCCH resource used to perform the quasi-periodic CSI feedback or indication information for indicating a PUSCH resource used to perform the quasi-periodic CSI feedback. Specifically, the PUCCH resource or the PUSCH resource used to perform the quasi-periodic CSI feedback may be a universal PUCCH resource or PUSCH resource in a protocol, and may also be a semi-persistent PUCCH resource or a semi-persistent PUSCH resource, which will not be elaborated in this embodiment.

The duration of the quasi-periodic CSI feedback may be represented by the number of times of the quasi-periodic CSI feedback or a time length for performing the quasi-periodic CSI feedback. Therefore, the duration candidate values of the quasi-periodic CSI feedback include: candidate values for the number of times of the quasi-periodic CSI feedback or candidate values for the time length of the quasi-periodic CSI feedback.

For the technical solutions illustrated in FIG. 3, in a possible implementation manner, the operation that the second information sent by the network side device is received may include the following action.

MAC CE signaling carrying the second information or DCI signaling carrying the second information is received.

Through the above two possible implementation manners, after the terminal device receives and acquires the first information and the second information, two contents can be obtained. The first content is relevant information required to activate the quasi-periodic CSI feedback, and thus includes the resource indicator used to perform the quasi-periodic CSI feedback and the activation indicator for activating the quasi-periodic CSI feedback. The second content is relevant information required to deactivate the quasi-periodic CSI feedback, and thus includes the duration candidate values for the quasi-periodic CSI feedback and the determination information for determining the duration of the quasi-periodic CSI feedback from the candidate values. The terminal can know when to deactivate the quasi-periodic CSI feedback based on the abovementioned second content. Therefore, in a possible implementation manner, the operation that the duration of the quasi-periodic CSI feedback is determined based on the first information and the second information may include the following action.

Based on the determination information in the second information, a unique number of times of the quasi-periodic CSI feedback or a unique time length of the quasi-periodic CSI feedback is determined from the candidate values for the number of times of the quasi-periodic CSI feedback or the candidate values for the time length of the quasi-periodic CSI feedback.

According to the above implementation manner, after the terminal determines the number of times of the quasi-periodic CSI feedback or the time length of the quasi-periodic CSI feedback, the terminal can feed the quasi-periodic CSI back to the network side device in a determined number of times of the quasi-periodic CSI feedback or a determined time length of the quasi-periodic CSI feedback. Based on the foregoing implementation manner, the operation that quasi-periodic CSI is fed back to the network side device may include the following action.

The quasi-periodic CSI is fed back to the network side device through at least one of a PUCCH resource or a PUSCH resource indicated in the resource indicator for performing the quasi-periodic CSI feedback.

For the technical solutions illustrated in FIG. 3, the quasi-periodic CSI fed back by the terminal is obtained through measuring a resource configured by the network side device. Therefore, the operation that quasi-periodic CSI is fed back to the network side device within the duration may include the following actions.

Before the quasi-periodic CSI is fed back to the network side device at each time within the duration, a measurement resource configured by the network side device is measured.

The quasi-periodic CSI is reported to the network side device based on a measurement result.

Specifically, the measurement resource includes: a periodic CSI-Reference Signal (CSI-RS) resource, or a periodic Synchronization Signal Block (SSB) resource, or a quasi-periodic CSI-RS resource, or a quasi-periodic SSB resource.

In at least one example, the quasi-periodic CSI fed back at each time is sent to the network side device after the measurement resource is measured, and measurement resource measured at each time may be the same and may also be different. Therefore, in at least one example, the operation that the measurement resource configured by the network side device is measured may include the following action.

Same measurement resource configured by the network side device is measured at each time; or different measurement resources configured by the network side device are measured at each time.

Specifically, the specific type of the quasi-periodic CSI may include one or more of the following: a CSI-RS Resource Indicator (CRI), a Rank Indication (RI), a Precoding Matrix Indicator (PMI), a Channel Quality Indicator (CQI), a single wideband indication i1 for indicating a codebook index, a Reference Signal Receiving Power (RSRP), an SSB-index or a Layer Index (LI).

Embodiment 3

Figure 4:
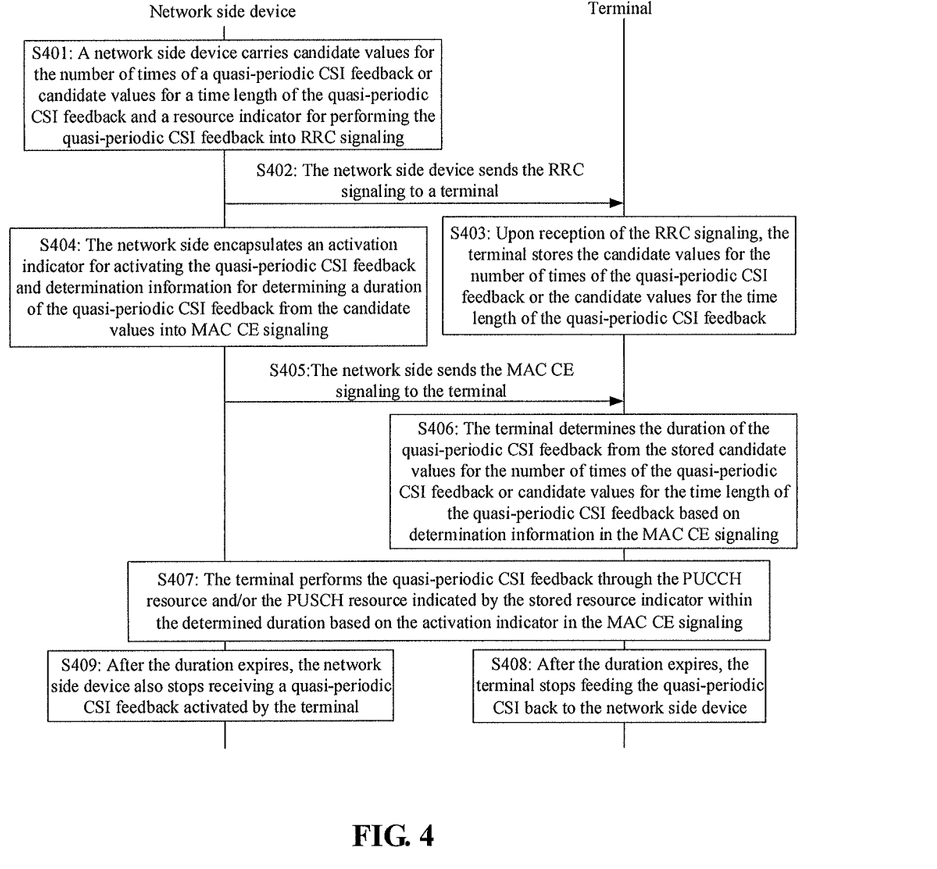
FIG. 4 illustrates a detailed schematic flowchart of a method for transmitting information provided by an embodiment of the disclosure.

Based on an inventive concept same as the foregoing embodiment, FIG. 4 illustrates a detailed flow for transmitting information provided by an embodiment of the disclosure. The flow may be exemplarily applied to the system illustrated in FIG. 1, and may include the following operations.

At S401, a network side device carries candidate values for the number of times of a quasi-periodic CSI feedback or candidate values for a time length of the quasi-periodic CSI feedback and a resource indicator for performing the quasi-periodic CSI feedback into the RRC signaling.

Specifically, the resource indicator for performing the quasi-periodic CSI feedback may include at least one of: indication information for indicating a PUCCH resource used to perform the quasi-periodic CSI feedback or indication information for indicating a PUSCH resource used to perform the quasi-periodic CSI feedback.

In addition, the candidate values for the number of times and the candidate values for the time length may be embodied in a form of a set. For example, a set of the candidate values for the number of times is {4, 8, 12, 16}, a set of the candidate values for the time length may be {5, 10, 15, 20} in unit of number of slots, and a set value of a transmission coefficient is N.

At S402, the network side device sends the RRC signaling to a terminal.

At S403, upon reception of the RRC signaling, the terminal stores the candidate values for the number of times of the quasi-periodic CSI feedback or the candidate values for the time length of the quasi-periodic CSI feedback.

At S404, the network side encapsulates an activation indicator for activating the quasi-periodic CSI feedback and determination information for determining a duration of the quasi-periodic CSI feedback from the candidate values into MAC CE signaling.

Specifically, responsive to determining that the duration candidate values are the candidate values for the number of times or the candidate values for the time length, the determination information may include an information domain for indicating the number of transmission times of the quasi-periodic CSI feedback or the time length of the quasi-periodic CSI feedback. For example, the number of bits occupied by the information domain is $\log_2 (N)$ and is rounded upward. In this embodiment, the number of bits occupied by the information domain is 2. 00 may correspond to the number of transmission times of 4 or the duration length of 5 slots, 01 corresponds to the number of transmission times of 8 or the duration length of 10 slots, 10 corresponds to the number of transmission times of 12 or the duration length of 15 slots, and 11 corresponds to the number of transmission times of 16 or the duration length of 20 slots.

At S405, the network side sends the MAC CE signaling to the terminal.

At S406, the terminal determines the duration of the quasi-periodic CSI feedback from the stored candidate values for the number of times of the quasi-periodic CSI feedback or candidate values for the time length of the quasi-periodic CSI feedback based on determination information in the MAC CE signaling.

For example, it is assumed that the information domain is 00, the number of transmission times of the quasi-periodic CSI feedback can be correspondingly selected from the set {4, 8, 12, 16} of the candidate values for the number of times to be 4, or the time length of the quasi-periodic CSI feedback can be selected from the set {5, 10, 15, 20} of the candidate values for the time length to be 5 slots.

At S407, the terminal performs the quasi-periodic CSI feedback through at least one of the PUCCH resource or the PUSCH resource indicated by the stored resource indicator within the determined duration based on the activation indicator in the MAC CE signaling.

Specifically, during the implementation of the quasi-periodic CSI feedback, before the terminal feeds the quasi-periodic CSI back to the network side device at each time during the duration, a measurement resource configured by the network side device is measured and the quasi-periodic CSI is reported to the network side device based on a measurement result.

Specifically, the measurement resource may include a periodic CSI-RS resource, or a periodic SSB resource, or a quasi-periodic CSI-RS resource, or a quasi-periodic SSB resource.

In addition, during the measurement of the measurement resource configured by the network side device, at each time the terminal may measure same measurement resource configured by the network side device, or measure different measurement resources configured by the network side device.

Specifically, a specific type of the quasi-periodic CSI fed back by the terminal may include one or more of a CRI, an RI, a PMI, a CQI, an i1, an RSRP, an SSB-Index and an LI.

At S408, after the duration expires, the terminal stops feeding the quasi-periodic CSI back to the network side device.

At S409, after the duration expires, the network side device also stops receiving a quasi-periodic CSI feedback activated by the terminal.

The detailed flow in this embodiment describes specific implementation solutions of the foregoing embodiment. It may be understood that after the terminal receives the first information and the second information sent by the network side device, the terminal determines the duration of the quasi-periodic CSI feedback, and when the duration expires, the terminal stops feeding the quasi-periodic CSI back to the network side device. Therefore, the deactivation on the quasi-periodic CSI feedback is implemented.

Embodiment 4

Figure 5:
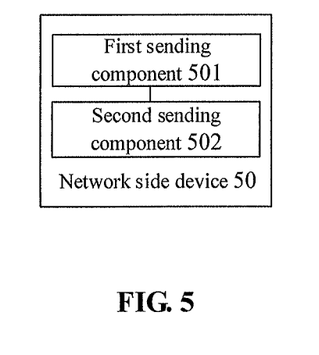
FIG. 5 illustrates a schematic diagram of components of a network side device provided by an embodiment of the disclosure.

Based on an inventive concept same as the foregoing embodiment, FIG. 5 illustrates a network side device 50 provided by an embodiment of the disclosure. The network side device 50 may include a first sending component 501 and a second sending component 502. The first sending component 501 is configured to send first information to a terminal device. The first information includes resource indicator for performing a quasi-periodic CSI feedback and duration candidate values of the quasi-periodic CSI feedback.

The second sending component 502 is configured to send second information to the terminal device. The second information includes an activation indicator for activating the quasi-periodic CSI feedback and determination information for determining a duration of the quasi-periodic CSI feedback from the candidate values.

In the above solutions, the first sending component 501 is configured to send RRC signaling carrying the first information or MAC CE signaling carrying the first information to the terminal device.

In the above solutions, the second sending component 502 is configured to send MAC CE signaling carrying the second information or DCI signaling carrying the second information to the terminal device.

In the above solutions, the resource indicator for performing the quasi-periodic CSI feedback may include at least one of indication information for indicating a PUCCH resource used to perform the quasi-periodic CSI feedback or indication information for indicating a PUSCH resource used to perform the quasi-periodic CSI feedback.

The duration candidate values of the quasi-periodic CSI feedback include candidate values for the number of times of the quasi-periodic CSI feedback or candidate values for a time length of the quasi-periodic CSI feedback.

It may be understood that in the embodiments of the disclosure, "component" may be a partial circuit, a partial processor, a partial program or software and the like, and certainly may also be a unit, may further be a module and may also be non-modular.

In addition, each component in this embodiment may be integrated into a processing unit, each component may also physically exist independently, and two or more than two units may also be integrated into a unit. The integrated unit may be implemented in a form of hardware, and may also be implemented in a form of a software functional module.

When being realized in form of software functional unit and sold or used as an independent product, the integrated unit may be stored in a computer-readable storage medium. Based on such an understanding, the technical solutions of the disclosure substantially or parts making contributions to the conventional art or all or part of the technical solutions may be embodied in form of software product, and the computer software product is stored in a storage medium, including a plurality of instructions configured to enable a computer device (which may be a personal computer, a server, a network device or the like) or a processor to execute all or part of the operations of the method in each embodiment of the disclosure. The abovementioned storage medium includes: various media capable of storing program codes such as a U disk, a mobile hard disk, a Read Only Memory (ROM), a Random Access Memory (RAM), a magnetic disk or an optical disk.

Therefore, the disclosure provides a computer storage medium. The computer storage medium stores an information transmission program, and the information transmission program, when executed by at least one processor, implements the operations of the method in Embodiment 1.

Figure 6:
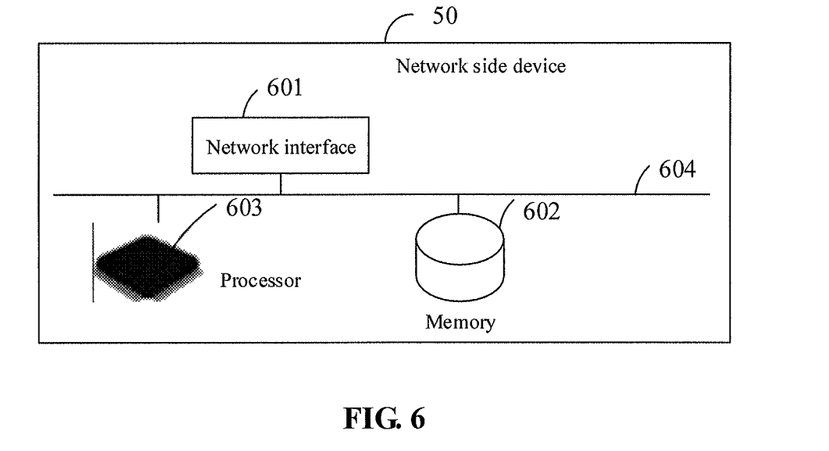
FIG. 6 illustrates a structural schematic diagram of specific hardware of a network side device provided by an embodiment of the disclosure.

Based on the network side device 50 and the computer storage medium, FIG. 6 illustrates a network side device 50 provided by an embodiment of the disclosure. The network side device 50 may include: a first network interface 601, a first memory 602 and a first processor 603. Components are coupled together via a bus system 604. It may be understood that the bus system 604 is configured to implement connection and communication among these components. In addition to a data bus, the bus system 604 may further include a power bus, a control bus and a state signal bus. However, for the clarity, various buses in FIG. 6 are marked as the bus system 604.

The first network interface 601 is configured to receive and send a signal in a process of receiving and sending information with other external network elements. The first memory 602 is configured to store a computer program capable of being operated on the first processor 603.

The first processor 603 is configured to execute the following operations when operating the computer program.

First information is sent to a terminal device, wherein the first information includes a resource indicator used to perform a quasi-periodic CSI feedback and duration candidate values of the quasi-periodic CSI feedback.

Second information is sent to the terminal device, wherein the second information includes an activation indicator for activating the quasi-periodic CSI feedback and determination information for determining a duration of the quasi-periodic CSI feedback from the candidate values.

It may be understood that the first memory 602 in this embodiment may be a volatile memory or a non-volatile memory, or may include the volatile memory and the non-volatile memory. The non-volatile memory may be an ROM, a Programmable ROM (PROM), an Erasable PROM (EPROM), an Electrically EPROM (EEPROM) or a flash memory. The volatile memory may be an RAM and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). The first memory 602 of the system and the method described in the disclosure is intended to include but not limited to memories of these and any other suitable type.

The first processor 603 may be an integrated circuit chip, and has a signal processing capability. During an implementation process, each operation of the method may be completed via an integrated logic circuit of hardware in the first processor 603 or an instruction in a software form. The first processor 603 may be a universal processor, a Digital Signal Processor (DSP), an Application Specific Integrated Circuit (ASIC) and a Field Programmable Gate Array (FPGA) or other programmable logic devices, discrete gates or transistor logic devices, and discrete hardware components. Each method, operation and logic block diagram disclosed in the embodiments of the disclosure may be implemented or executed. The universal processor may be a microprocessor or the processor may also be any conventional processor and the like. The operations of the methods disclosed in combination the embodiments of the disclosure may be directly embodied to be executed and completed by a hardware decoding processor or executed and completed by a combination of hardware and software modules in the decoding processor. The software module may be located in a mature storage medium in the art, such as an RAM, a flash memory, an ROM, a PROM, an EEPROM or a register. The storage medium is located in the first memory 602. The first processor 603 reads information in the first memory 602, and completes the operations of the above method in combination with hardware of the processor.

It may be understood that these embodiments described in the disclosure may be implemented by using hardware, software, firmware, middleware, a microcode or a combination thereof. For the implementation of the hardware, a processing unit may be implemented in one or more of an Application Specific Integrated Circuits (ASIC), a Digital Signal Processing (DSP), a DSP Device (DSPD), a Programmable Logic Device (PLD), a Field-Programmable Gate Array (FPGA), a universal processor, a controller, a microcontroller, a microprocessor, other electronic units configured to execute the functions of the disclosure or a combination thereof.

For the implementation of the software, technologies used in the disclosure may be implemented via modules for executing the functions of the disclosure (such as a process, a function and the like). The software code may be stored in the memory and executed via the processor. The memory may be implemented in the processor or out of the processor.

Specifically, the first processor 603 in the network side device 50 is further configured to execute, when operating the computer program, the operations of the method in Embodiment 1, which will not be elaborated here.

Embodiment 5

Figure 7:
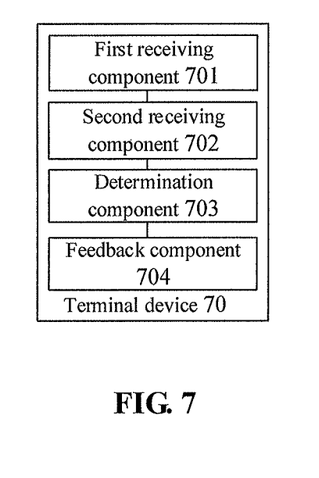
FIG. 7 illustrates a schematic diagram of components of a terminal device provided by an embodiment of the disclosure.

Based on an inventive concept same as the foregoing embodiment, FIG. 7 illustrates composition of a terminal device 70 provided by an embodiment of the disclosure. The terminal device 70 may include: a first receiving component 701, a second receiving component 702, a determination component 703 and a feedback component 704.

The first receiving component 701 is configured to receive first information sent by a network side device. The first information includes a resource indicator for performing a quasi-periodic CSI feedback and duration candidate values of the quasi-periodic CSI feedback.

The second receiving component 702 is configured to receive second information sent by the network side device. The second information includes an activation indicator for activating the quasi-periodic CSI feedback and determination information for determining a duration of the quasi-periodic CSI feedback from the candidate values.

The determination component 703 is configured to determine, based on the first information and the second information, the duration of the quasi-periodic CSI feedback.

The feedback component 704 is configured to feed the quasi-periodic CSI back to the network side device within the duration, and stop feeding the quasi-periodic CSI back to the network side device when the duration expires.

In the above solutions, the first receiving component 701 is configured to receive RRC signaling carrying the first information or MAC CE signaling carrying the first information.

In the above solutions, the second receiving component 702 is configured to receive MAC CE signaling carrying the second information or DCI signaling carrying the second information.

In the above solutions, the resource indicator for performing the quasi-periodic CSI feedback may include at least one of: indication information for indicating a PUCCH resource used to perform the quasi-periodic CSI feedback or indication information for indicating a PUSCH resource used to perform the quasi-periodic CSI feedback.

The duration candidate values of the quasi-periodic CSI feedback include: candidate values for the number of times of the quasi-periodic CSI feedback or candidate values for a time length of the quasi-periodic CSI feedback.

In the above solutions, the determination component 703 is configured to determine, based on the determination information in the second information, a unique number of times of the quasi-periodic CSI feedback or a unique time length of the quasi-periodic CSI feedback from the candidate values for the number of times of the quasi-periodic CSI feedback or the candidate values for the time length of the quasi-periodic CSI feedback.

In the above solutions, the feedback component 704 is configured to feed the quasi-periodic CSI back to the network side device through at least one of the PUCCH resource or the PUSCH resource indicated by the resource indicator for performing the quasi-periodic CSI feedback.

In the above solutions, the feedback component 704 is configured to perform the following operations.

Before the quasi-periodic CSI is fed back to the network side device at each time within the duration, a measurement resource configured by the network side device is measured.

The quasi-periodic CSI is reported to the network side device based on a measurement result.

In the above solutions, the measurement resource includes: a periodic CSI-RS resource, a periodic SSB resource, or a quasi-periodic CSI-RS resource, or a quasi-periodic SSB resource.

In the above solutions, the feedback component 704 is configured to perform the following operation.

Same measurement resource configured by the network side device is measured at each time; or different measurement resources configured by the network side device are measured at each time.

In the above solutions, the quasi-periodic CSI includes one or more of a CRI, an RI, a PMI, a CQI, an i1, an RSRP, an SSX-Index and an LI.

In addition, the disclosure provides a computer storage medium. The computer storage medium stores an information transmission program, and the information transmission program, when executed by at least one processor, implements the operations of the method in Embodiment 2. Specific description on the computer storage medium is referred to the description in Embodiment 4, and will not be elaborated here.

Figure 8:
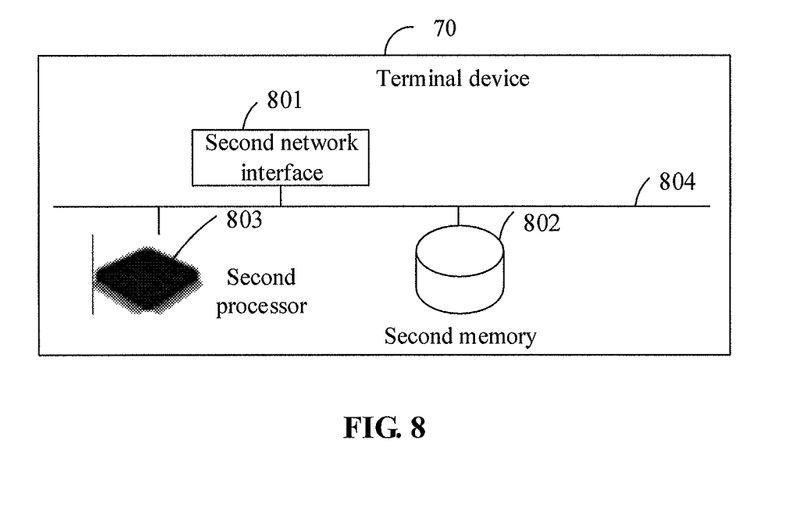
FIG. 8 illustrates a structural schematic diagram of specific hardware of a terminal device provided by an embodiment of the disclosure.

Based on the terminal device 70 and the computer storage medium, FIG. 8 illustrates a specific hardware composition of a terminal device 80 provided by an embodiment of the disclosure. The terminal device may include: a second network interface 801, a second memory 802 and a second processor 803. Components are coupled together via a bus system 804. It may be understood that the bus system 804 is configured to implement connection and communication among these components. In addition to a data bus, the bus system 804 may further include a power bus, a control bus and a state signal bus. However, for the clarity, various buses in FIG. 8 are marked as the bus system 804.

The second network interface 801 is configured to receive and send a signal in a process of receiving and sending information with other external network elements.

The second memory 802 is configured to store a computer program capable of being operated on the second processor 803.

The second processor 803 is configured to execute the following operations when operating the computer program.

First information sent by a network side device is received, wherein the first information includes a resource indicator for performing a quasi-periodic CSI feedback and duration candidate values of the quasi-periodic CSI feedback.

Second information sent by the network side device is received, wherein the second information includes an activation indicator for activating the quasi-periodic CSI feedback and determination information for determining a duration of the quasi-periodic CSI feedback from the candidate values.

The duration of the quasi-periodic CSI feedback is determined based on the first information and the second information, t.

Quasi-periodic CSI is fed back to the network side device within the duration.

When the duration expires, the quasi-periodic CSI is stopped being fed back to the network side device.

It may be understood that components in the specific hardware structure of the terminal device 70 in this embodiment are similar to corresponding portions in the foregoing embodiments of the disclosure, and will not be elaborated here.

Specifically, the second processor 803 in the terminal device 70 is further configured to execute, when operating the computer program, the operations of the method in Embodiment 2, which will not be elaborated here.

The above are only preferred embodiments of the disclosure, and are not intended to limit a scope of protection of the disclosure.

INDUSTRIAL APPLICABILITY

In the embodiments of the disclosure, the network side device can provide, while indicating a resource used by the quasi-periodic CSI feedback and activating the quasi-periodic CSI feedback, the duration candidate values of the quasi-periodic CSI feedback and the determination information for determining the duration of the quasi-periodic CSI feedback in the candidate values. Therefore, the terminal acquires the duration of the quasi-periodic CSI feedback based on the duration candidate values and the determination information and then deactivates the quasi-periodic CSI feedback, thereby implementing the deactivation on the quasi-periodic CSI reporting mechanism, preventing a situation that the terminal cannot stop feeding back the quasi-periodic CSI in an appropriate time, and saving channel resources.

The invention claimed is:

1. A method for transmitting information, applied to a network side device and comprising:
   sending first information to a terminal device, the first information comprising a resource indicator for performing a quasi-periodic Channel State Information (CSI) feedback and duration candidate values of the quasi-periodic CSI feedback, wherein the duration candidate values of the quasi-periodic CSI feedback comprise:
   candidate values for a number of times of the quasi-periodic CSI feedback or candidate values for a time length of the quasi-periodic CSI feedback; and
   wherein the resource indicator for performing the quasi-periodic CSI feedback comprises indication information for indicating a Physical Uplink Control Channel (PUCCH) resource used to perform the quasi-periodic CSI feedback;
   sending second information to the terminal device, the second information comprising an activation indicator for activating the quasi-periodic CSI feedback and determination information for determining a duration of the quasi-periodic CSI feedback from the candidate values.

2. The method of claim 1, wherein the resource indicator for performing the quasi-periodic CSI feedback comprises indication information for indicating a Physical Uplink Shared Channel (PUSCH) resource used to perform the quasi-periodic CSI feedback.

3. A method for transmitting information, applied to a terminal device and comprising:
receiving first information sent by a network side device, the first information comprising a resource indicator for performing a quasi-periodic Channel State Information (CSI) feedback and duration candidate values of the quasi-periodic CSI feedback, wherein the duration candidate values of the quasi-periodic CSI feedback comprise: candidate values for a number of times of the quasi-periodic CSI feedback or candidate values for a time length of the quasi-periodic CSI feedback;
wherein the resource indicator for performing the quasi-periodic CSI feedback comprises indication information for indicating a Physical Uplink Control CHannel (PUCCH) resource used to perform the quasi-periodic CSI feedback;
receiving second information sent by the network side device, the second information comprising an activation indicator for activating the quasi-periodic CSI feedback and determination information for determining a duration of the quasi-periodic CSI feedback from the candidate values;
determining the duration of the quasi-periodic CSI feedback based on the first information and the second information;
feeding quasi-periodic CSI back to the network side device within the duration; and
stopping feeding the quasi-periodic CSI back to the network side device when the duration expires.

4. The method of claim 3, wherein receiving the first information sent by the network side device comprises:
receiving Radio Resource Control (RRC) signaling carrying the first information or Medium Access Control Layer Control Element (MAC CE) signaling carrying the first information; and
wherein receiving the second information sent by the network side device comprises:
receiving MAC CE signaling carrying the second information or Downlink Control Information (DCI) signaling carrying the second information.

5. The method of claim 3, wherein the resource indicator for performing the quasi-periodic CSI feedback comprises indication information for indicating a Physical Uplink Shared CHannel (PUSCH) resource used to perform the quasi-periodic CSI feedback.

6. The method of claim 5, wherein feeding the quasi-periodic CSI back to the network side device comprises: feeding the quasi-periodic CSI back to the network side device through at least one of the PUCCH resource or the PUSCH resource indicated in the resource indicator for performing the quasi-periodic CSI feedback.

7. The method of claim 3, wherein determining the duration of the quasi-periodic CSI feedback based on the first information and the second information comprises:
determining, based on the determination information in the second information, a unique number of times of the quasi-periodic CSI feedback or a unique time length of the quasi-periodic CSI feedback from the candidate values for the number of times of the quasi-periodic CSI feedback or the candidate values for the time length of the quasi-periodic CSI feedback.

8. The method of claim 3, wherein feeding the quasi-periodic CSI back to the network side device within the duration comprises:
measuring a measurement resource configured by the network side device before performing each feedback of the quasi-periodic CSI to the network side device within the duration; and
reporting the quasi-periodic CSI to the network side device based on a measurement result.

9. The method of claim 8, wherein the measurement resource comprises one of the following: a periodic CSI-Reference Signal (CSI-RS) resource, a periodic Synchronization Signal Block (SSB) resource, a quasi-periodic CSI-RS resource, or a quasi-periodic SSB resource.

10. The method of claim 3, wherein the quasi-periodic CSI comprises at least one of the following: a CSI-RS Resource Indicator (CRI), a Rank Indication (RI), a Precoding Matrix Indicator (PMI), a Channel Quality Indicator (COI), a single wideband indication i1 for indicating a codebook index, a Reference Signal Receiving Power (RSRP), an SSB-Index or a Layer Index (LI).

11. A terminal device, comprising a network interface, a memory for storing a computer program, and a processor, wherein the processor is configured to execute the computer program to control the network interface to:
receive first information sent by a network side device, the first information comprising a resource indicator for performing a quasi-periodic Channel State Information (CSI) feedback and duration candidate values of the quasi-periodic CSI feedback, wherein the duration candidate values of the quasi-periodic CSI feedback comprise:
candidate values for a number of times of the quasi-periodic CSI feedback or candidate values for a time length of the quasi-periodic CSI feedback;
wherein the resource indicator for performing the quasi-periodic CSI feedback comprises indication information for indicating a Physical Uplink Control CHannel (PUCCH) resource used to perform the quasi-periodic CSI feedback;
and
receive second information sent by the network side device, the second information comprising an activation indicator for activating the quasi-periodic CSI feedback and determination information for determining a duration of the quasi-periodic CSI feedback from the candidate values; and
the processor is further configured to execute the computer program to:
determine, based on the first information and the second information, the duration of the quasi-periodic CSI feedback; and
feed the quasi-periodic CSI back to the network side device within the duration, and stop feeding the quasi-periodic CSI back to the network side device when the duration expires.

12. The terminal device of claim 11, wherein the network interface is configured to receive Radio Resource Control (RRC) signaling carrying the first information or Medium Access Control Layer Control Element (MAC CE) signaling carrying the first information.

13. The terminal device of claim 11, wherein the network interface is configured to receive MAC CE signaling carrying the second information or Downlink Control Information (DCI) signaling carrying the second information.

14. The terminal device of claim 11, wherein the resource indicator for performing the quasi-periodic CSI feedback comprises indication information for indicating a Physical Uplink Shared CHannel (PUSCH) resource used to perform the quasi-periodic CSI feedback.

15. The terminal device of claim 11, wherein the processor is configured to determine, based on the determination information in the second information, a unique number of times of the quasi-periodic CSI feedback or a unique time length of the quasi-periodic CSI feedback from the candidate values for the number of times of the quasi-periodic CSI feedback or the candidate values for the time length of the quasi-periodic CSI feedback.

16. The terminal device of claim 14, wherein the processor is configured to feed the quasi-periodic CSI back to the network side device through at least one of the PUCCH resource or the PUSCH resource indicated in the resource indicator for performing the quasi-periodic CSI feedback.

17. The terminal device of claim 11, wherein the processor is configured to:
measure a measurement resource configured by the network side device before performing each feedback of the quasi-periodic CSI to the network side device within the duration; and
report the quasi-periodic CSI to the network side device based on a measurement result.

18. The terminal device of claim 17, wherein the measurement resource comprises one of the following: a periodic CSI-Reference Signal (CSI-RS) resource, a periodic Synchronization Signal Block (SSB) resource, a quasi-periodic CSI-RS resource, or a quasi-periodic SSB resource.

19. The terminal device of claim 18, wherein the processor is configured to:
measure same measurement resource, configured by the network side device, at each time; or, measure different measurement resources, configured by the network side device, at each time.

20. The terminal device of claim 11, wherein the quasi-periodic CSI comprises at least one of the following: a CSI-RS Resource Indicator (CRI), a Rank Indication (RI), a Precoding Matrix Indicator (PMI), a Channel Quality Indicator (CQI), a single wideband indication i1 for indicating a codebook index, a Reference Signal Receiving Power (RSRP), an SSB-Index or a Layer Index (LI).

* * * * *